US005425456A

United States Patent [19]
Erickson

[11] Patent Number: 5,425,456
[45] Date of Patent: Jun. 20, 1995

[54] WASTE COLLECTION AND SEPARATION APPARATUS AND METHOD

[75] Inventor: Stewart E. Erickson, Marietta, Pa.

[73] Assignee: S.E.E.C., Inc., Marietta, Pa.

[21] Appl. No.: 223,695

[22] Filed: Apr. 6, 1994

[51] Int. Cl.⁶ ............................................. B03B 9/00
[52] U.S. Cl. ....................................... 209/2; 209/10; 209/11; 209/702; 209/930
[58] Field of Search ................ 209/1, 2, 10, 11, 702, 209/930, 935, 942; 383/7, 24, 37, 44, 45, 210, 39, 59, 60, 64, 72, 80, 81, 97, 106, 113, 99; 220/908, 909; 414/391

[56] References Cited

U.S. PATENT DOCUMENTS

| | | | |
|---|---|---|---|
| 2,712,797 | 7/1955 | Woehrle et al. | 296/39 |
| 2,875,562 | 3/1959 | Mitchell | 53/22 |
| 3,806,185 | 4/1974 | Brandjord | 296/98 |
| 4,204,842 | 5/1980 | Morel et al. | 48/197 |
| 4,461,402 | 7/1984 | Fell et al. | 222/105 |
| 4,470,749 | 9/1984 | Koudstaal | 414/539 |
| 4,541,765 | 9/1985 | Moore | 414/267 |
| 4,678,389 | 7/1987 | Bonerb | 414/267 |
| 4,758,344 | 7/1988 | Wildenauer | 210/603 |
| 4,946,214 | 8/1990 | Neumann et al. | 296/10 |
| 4,949,528 | 8/1990 | Palik | 209/930 X |
| 4,975,019 | 12/1990 | Cate et al. | 220/908 X |
| 4,987,988 | 1/1991 | Messina et al. | 220/98 X |
| 5,015,142 | 5/1991 | Carson | 220/909 X |
| 5,100,005 | 3/1992 | Noble et al. | 209/930 X |
| 5,143,246 | 9/1992 | Johnson et al. | 220/909 X |
| 5,242,220 | 9/1993 | Sandreth | 220/909 X |
| 5,275,522 | 5/1994 | Garrett, Jr. et al. | 414/407 |

FOREIGN PATENT DOCUMENTS 585205 11/1958 Italy.

OTHER PUBLICATIONS

Article from BioCycle, Jul. 1994, p. 20.
Brochure of Amfuel entitled "Fabribin ® Cuts Costs on Shipping/Handling/Storage!" (no date).
Brochure of Uniroyal Sealdtank ® "Now . . . Haul Liquid Lading in Any Dry Bed." (no date).
Spenceer, Robert L., "Source Separated Composts Analyzed for Quality," *BioCycle*, Feb. 1994, pp. 80–83.

*Primary Examiner*—D. Glenn Dayoan
*Attorney, Agent, or Firm*—Fredrikson & Byron

[57] ABSTRACT

A waste collection and separation apparatus having a plurality of reusable primary containers for receiving waste materials at the location of an individual user, a plurality of reusable secondary containers for aggregating a plurality of filled primary containers and a plurality reusable tertiary containers. The primary containers are flexible, sealable, substantially puncture resistant and have a volume of not more than 10 cubic feet. The secondary containers are flexible, sealable, and have an opening, lifting device and volume of between 10 and 750 cubic feet. The tertiary containers are flexible, substantially puncture resistant and have a lifting device and a volume of at least about 700 cubic feet.

16 Claims, 6 Drawing Sheets

WASTE COLLECTION AND SEPARATION APPARATUS AND METHOD

BACKGROUND

1. Field of the Invention

The present invention relates to an apparatus and method for separating and collecting recyclable and compostable waste materials. The apparatus of the present invention is an assembly of a series of reusable containers, and the method of the invention involves the use of these containers.

2. The Prior Art

The disposal of waste in the United States and other countries is becoming a significant social and economic problem. The rate at which waste is currently being generated in the United States is increasing, while the excess capacity of landfills is decreasing. Consequently, our landfills are overburdened and even become a separate source of pollution.

To decrease the burden on our landfills, as much waste as possible needs to be reprocessed so that it can be reused for beneficial purposes. Reusing waste requires separating the waste into individual waste streams having common recycling characteristics. For example, materials such as food waste, aluminum, ferrous metals, paper products, plastics and glass may be processed and eventually reused. Reusing such waste materials reduces both the overall amount of solid waste that is permanently disposed of in landfills and the need for obtaining new raw materials. Therefore, a need exists to efficiently separate and collect waste materials so that as much waste as possible is recovered.

One significant environmental problem associated with waste disposal relates to the disposal of batteries. Most batteries include heavy metals which pose threats to the environment, including nickel, cadmium, mercury and lead. Steps are being taken to collect certain types of batteries for disposal in a safe manner which controls the release of these hazardous materials. For example, most retailers of automobile batteries have programs where they will accept their customers' used batteries and will either recycle them or dispose of them in a controlled fashion that minimizes environmental risks.

However, a growing number of common consumer devices and appliances run on disposable batteries. Presently, there is no wide-spread, easy to use system available to average household users which permit them to easily dispose of batteries separately in an environmentally responsible manner. Some metropolitan areas have designated certain collection sites for household batteries. Since each battery tends to be rather small and consumers seem to perceive the environmental impact of each battery as relatively minor, though, consumers generally do not take the extra effort to separately collect such batteries and drop them off at such designated collection sites.

Instead, the consumers usually throw batteries away with their normal, non-recyclable waste, leading to the disposal of a very substantial number of such batteries in landfills or in waste incineration facilities. Although the environmental impact of each battery may be relatively small, the vast quantities of the batteries being thrown away releases unacceptable volumes of heavy metals into the environment, and these heavy metals tend to collect in the ground water, adversely affecting the quality of the water.

Various devices have been developed to separate and collect waste according to the conventional system. One device, U.S. Pat. No. 5,275,522 (Garrett, Jr. et al.), is a waste separation and collection system having a multi-compartment inside container for the initial separation, an outside container that interfaces with the inside container so that the separated contents of the inner container can be dumped into the outside container, and a mobile collection unit that transfers the separated waste from the outside container into a plurality of bins. The mobile unit preserves the separation of the waste, and it transports the waste to a distribution facility. This device does not provide collapsible containers which may be sealed to prevent odors and hazardous vapors from escaping into the surrounding environment. Also, this device does not provide a means for long-term storage of the waste in discreet containers after it has been separated.

Conventional separation and collection systems are inconvenient and expensive for individuals to use. In conventional systems, consumers often purchase thin walled plastic trash bags which are easily punctured or torn open, causing the waste to leak into the garbage container. These trash bags are not only susceptible to tearing, but they are also not reusable. Conventional systems also generally use a system of bins in an individual's house or business. These bins must be washed by the individual users on a regular basis because there is often a significant amount of leakage from waste deposited directly in the bins or contained in torn plastic trash bags. Additionally, conventional curbside bins are difficult to collect after large snowstorms, and as a result, garbage is often left on curbs for several additional days after such storms.

Another problem of conventional separation and collection systems is that they are prohibitively expensive. In conventional systems, the separation of each type of waste is continually maintained by depositing the waste in separate compartments in a collection vehicle. Such continuous separation is time consuming and requires extensive labor because the waste from each user must be separated as it is collected. Continuous separation also requires an extensive capital investment because customized collection vehicles having compartments for holding the separated waste are used. As such, conventional systems are prohibitively expensive.

Yet another problem of conventional systems is that they generally do not adequately address the disposal of compostable waste materials. Such waste materials generally include food wastes from grocery stores, restaurants, or households and yard waste. It will be appreciated that compostable waste materials rot and become putrefied in a relatively short period of time. As such, these rotting waste materials are not only extremely odoriferous, but they also exude annoying and hazardous liquids. It is not uncommon for the dumpsters used by restaurants and grocery stores to be public health hazards and public nuisances. Therefore, a need exists to provide an apparatus and method for separating and collecting waste materials that is convenient to use, cost effective and adequately addresses the disposal of compostable materials.

Finally, it does not appear that any existing system has proposed a realistic, economically feasible way to handle used batteries generated at the household level. Most conventional recycling systems do not take into account the relatively small volume of such batteries generated in each household on a week-to-week basis. Municipal collection sites, where they are available, generally require consumers to either make a separate trip to a collection site every time they have a battery to throw away or collect batteries for an extended period of time and then drop off those batteries at a collection site. This appears to have proven too much trouble for most consumers and such municipal collection sites have met with limited success.

SUMMARY OF THE INVENTION

The present invention provides an apparatus including a series of reusable containers for collecting and separating waste materials and a method for collecting and handling waste. The apparatus of the invention includes a plurality of primary reusable containers for receiving separated waste materials at the location of an individual user. The primary containers generally have a volume of not more than 10 cubic feet, and are sealable, flexible, collapsible and substantially puncture resistant. Each primary container is filled with only a single type of waste material. Some or all of the primary containers may be provided with separate pouches or the like for retaining household batteries to separate the batteries from other waste streams.

For the purposes of the present invention, a single type of waste material is defined by how each individual waste management facilitator collects, separates and processes the waste streams. Generally, a single type of waste material includes materials having common recycling or composting characteristics, or materials that may be automatically separated by a machine. For instance, materials such as glass, paper products, aluminum, used batteries and food wastes may each be a single type of waste material. Yet, a combination of glass and aluminum, for example, may be a single type of waste material for collection purposes if the local waste management facilitator can automatically separate the glass and aluminum.

The apparatus further includes secondary reusable containers for aggregating a plurality of filled primary containers at the location of a user, and tertiary containers which may be positioned on collection vehicles. The secondary containers include a means for lifting and may have a volume of, for example, 10 to 765 cubic feet. The secondary containers are flexible, collapsible and substantially puncture resistant. The secondary containers may also be sealable. The tertiary reusable containers are flexible, collapsible and substantially puncture resistant, and have a means for lifting. The tertiary containers are very large and may have a volume on the order of 700–1,200 cubic feet. The tertiary containers may be inserted and extracted from a simple collection vehicle, and are meant for holding a plurality of secondary containers.

One apparatus in accordance with the present invention comprises a tertiary container containing a plurality of filled secondary containers, with each of the secondary containers containing a plurality of primary containers. Each of the primary container is desirably filled with a single type of waste material.

As noted above, the present invention also includes a method for collecting and separating waste materials. In accordance with this aspect of the invention, a plurality of primary reusable containers are provided to individual users for use in normal indoor waste receptacles, and bulk waste is separated into different types of waste materials. Each type of waste material is then discarded into a separate primary container, and each separate primary container may be sealed when it is full.

The process of the invention may further include providing at least one secondary reusable container to each individual user for aggregating the filled primary containers at each individual user's location in preparation of collection. Next a tertiary reusable container may be provided (e.g. in a collection vehicle), and each secondary container at each user's location may be deposited into the tertiary container on the collection vehicle. The assembly of the primary containers, secondary containers and tertiary container can be hauled to a collection site where the tertiary container is extracted from the collection vehicle, the secondary containers are unloaded from the tertiary containers, and the primary containers are removed from the secondary containers. The primary containers may be sorted at a centralized collection site according to the waste contained therein, and emptied at an appropriate processing site.

After the primary and secondary containers are emptied, they can be cleaned and redelivered to each individual user for reuse. Accordingly, two sets of primary and secondary containers would be necessary for efficient operation, a first set in which the individual users deposit their waste, and a second, fresh set which is delivered to each individual user for use during the next waste period. The sets are rotated so that the individual users always receive a fresh set of containers when their waste is collected.

One objective of the present invention is to provide a cost effective apparatus and method for disposing of recyclable and compostable waste materials. The present invention achieves this objective by providing an apparatus which may be quickly collected from each individual user's location and transported to a centralized staging area or collection site. The method of the current invention furthers this objective by centralizing the sorting procedure at a central site, thereby reducing the labor costs involved in separating the waste streams at each individual user's location.

Another objective of the present invention is to provide an apparatus and method for adequately disposing of compostable waste materials that are subject to rotting and spoilage. The present apparatus achieves this objective by providing primary and secondary containers which are sealable and substantially puncture proof. These containers trap both the odoriferous vapors and putrefied leakage of such waste materials.

Yet another objective of the present invention is to provide an apparatus and method which is convenient for individuals to use. The present apparatus achieves this objective by providing primary and secondary containers which are sealable, substantially puncture-proof, and reusable. The method of the current invention furthers this objective by automatically washing the containers before they are returned to the individual users.

A further objective of at least one embodiment of the invention is to provide a practical, convenient way for consumers to separately dispose of common household batteries. In this embodiment, this end is achieved by providing some or all of the primary containers with a separate external pocket or the like adapted to hold a relatively small volume of household batteries. The batteries in these pockets can be removed when the primary containers are emptied and the batteries can be centrally collected for suitable disposal or recycling.

DETAILED DESCRIPTION OF THE PREFERRED EMBODIMENT

Figure 1:
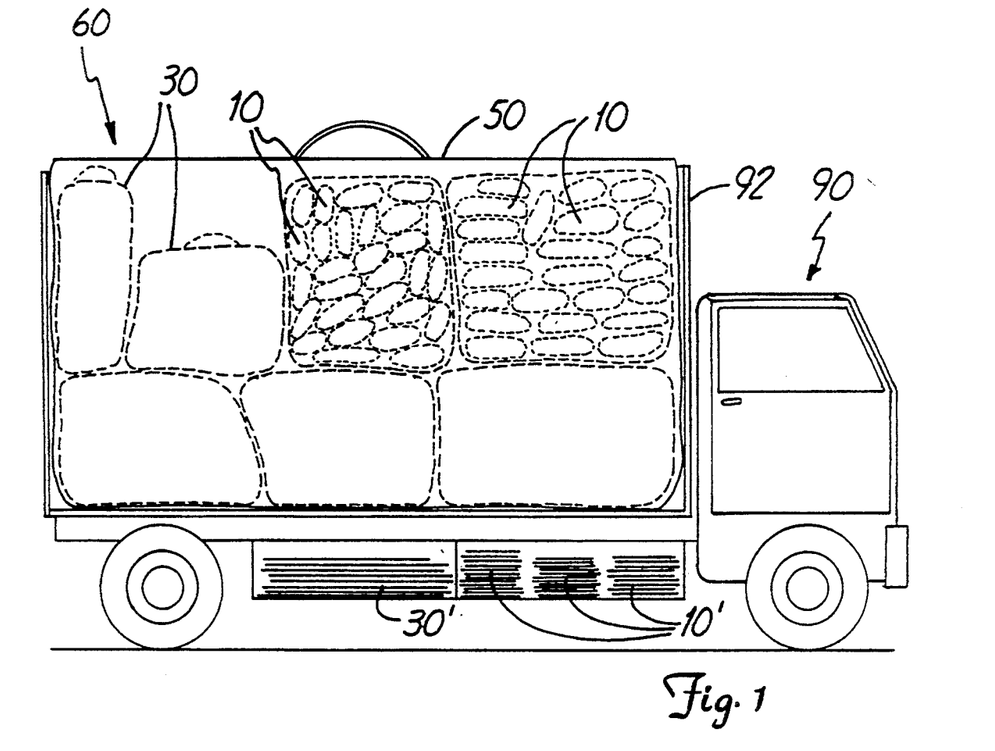
FIG. 1 is a side elevation view of an assembly representing an embodiment of the invention shown on a collection vehicle.

FIG. 1 illustrates an assembled waste collection and separation apparatus 60 embodying the present invention positioned on a waste collection vehicle 90. The invention uses a modular system of substantially leak-proof, reusable, collapsible containers deployed in three different levels of waste management. Each assembly 60 has a plurality primary containers 10 within a plurality of secondary containers 30, the primary containers being contained within the secondary containers and the secondary containers being contained within a tertiary container 50. The primary containers 10, secondary containers 30, and tertiary container 50 are separate and interchangeable containers that may be selected from a plurality of sizes and shapes to match the specific requirements of an individual user. An embodiment of the apparatus and its use in the method of the invention will be clearly understood with reference to FIGS. 1-6 and the following description.

Central to understanding the present invention is separating bulk waste into a number of waste streams such that each waste stream only includes a single type or class of waste material. For the purposes of the present invention, a single type of waste material is defined by how each individual waste management facilitator collects, separates and processes the individual waste streams.

Generally, a single type of waste material will consist of materials having common recycling or composting characteristics. In some areas, though, certain types of materials that may be automatically separated could also constitute a single type of waste material as that term is used herein. Broad classification of materials such as glass, paper products, aluminum, plastics, used batteries and food waste may each be a single type of waste material, but sub-groups such as green glass, brown glass, and clear glass may also separately define a single type of waste material, depending upon the specific requirements of the waste management facilitator. Also, a combination of materials, such as glass and aluminum, may be a single type of waste material for collection purposes if the local waste management facilitator automatically separates the combination.

Figure 3:
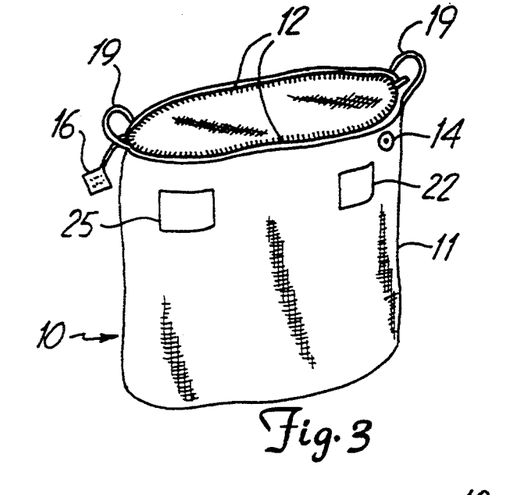
FIG. 3 is a perspective view of a primary container used in an embodiment of the invention.
Figure 4:
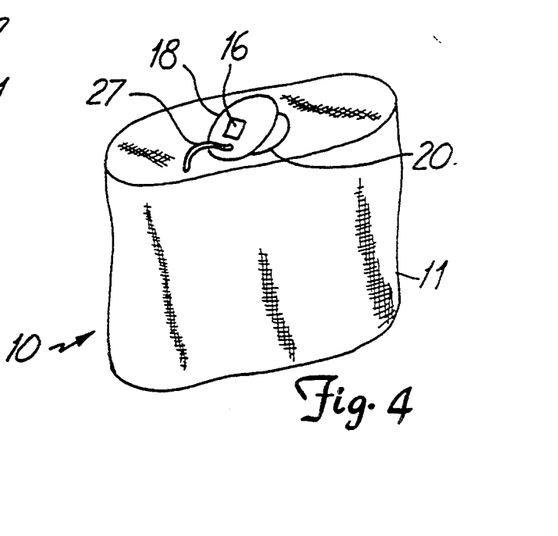
FIG. 4 is a perspective view of a primary container used in another embodiment of the invention.

The first module of the invention is the primary container 10. Referring to FIGS. 3 and 4, the primary container 10 has a reusable bladder 11 made from a chemically resistant laminate that is substantially leak-proof, flexible and substantially puncture resistant. The bladder 11 may be made from a single component or a combination of components such as nylon or other plastic materials, rubber materials, polyamides (e.g., Kevlar, available from E. I. DuPont), nitrylvinyl materials or the like. In a preferred embodiment, the ply thickness of the bladder 11 is approximately one-quarter inch thick.

In a preferred embodiment, the primary container 10 may be sealed by a substantially leak-proof seal 12. In one embodiment, the seal 12 is a substantially leak-proof, water-tight zipper; such zippers are known in the art and need not be detailed here. In another embodiment, the primary container 10 may be sealed by a cap 18, which is threadably receivable in a port 20 and is optimally connected to the container 10 by a tether line 27 so that it cannot be separated and lost. A pressure release valve 24 to relieve gas build-up within the container after the seal 12 or portable cap 18 is closed also may be included, with the valve being adapted to release pressure in excess of a certain predetermined level to avoid rupturing the container. Suitable one-way valves of this type are well known in the The primary containers 10 are used at the first level of the system inside an individual's home or business. The primary containers may be rigid enough to be free standing when expanded, or they can be inserted in common indoor waste receptacles to maintain them in an open state for use. In a preferred embodiment, at least one manually graspable handle 19 is provided so that the container may be easily inserted and extracted from waste receptacles or otherwise handled by the user.

An identification tag 16 or the like indicating the type of waste contained in the container may be provided with the container. Either instead of the identification tags or in addition thereto, the primary containers may be provided with a window 22 permitting users to view the contents of the container. Such identification tags and windows permit operators at the end of the process to direct the primary containers toward the proper recycling treatment when the various primary containers in a tertiary container are sorted, as outlined below.

The primary container 10 may also include a pocket 25 in which household batteries may be disposed. The size of this pocket may be adjusted as necessary, but should be large enough to contain a number of household batteries. For example, the pocket may be sized to hold the maximum number of batteries likely to be thrown away by an average household in an average collection cycle. It is believed that a pocket sized to hold eight to ten "AA"-sized batteries and eight or more "C" and "D" sized batteries will suffice for most applications, but these numbers may be adjusted as necessary.

The pocket is advantageously positioned where consumers can readily access it to encourage them to place used batteries into the pocket rather than just throwing them away in their normal, non-recyclable waste stream. The pocket 25 may simply take the form of a piece of fabric sewn to the exterior surface of the primary container. In a preferred embodiment, though, the pocket includes a liner or a removable insert formed of a material capable of resisting the corrosive effects of any leakage from damaged batteries. The pocket should be attached to the primary container in a fashion which will not materially affect the ability to seal the container and make it generally liquid-tight, such as by laminating separate sheets on the exterior of the container to build up a separate pocket.

In a particularly preferred embodiment, the pocket 25 is provided with a closure adapted to keep the batteries within the pocket from simply falling out during handling and transport of the containers. For example, the pocket may be provided with a closable flap transport of the containers. For example, the pocket may be provided with a closable flap (not shown) which extends across an upper opening of the pocket, not unlike the closure commonly used on pockets of some shirts and pants. This flap may include a hook and loop type closure (such as velcro or the like) which permits the user easily open the pocket, drop used batteries in the pocket, and reseal the pocket. If so desired, the flap may be biased toward a closed position to help ensure that the pocket will be sealed. For example, the flap may be made heavier by including a weight in the flap and gravity can be used to urge the flap down into engagement with a velcro seal or the like.

When the primary containers are sorted for recycling, as detailed below, the batteries may be emptied from these pouches for recycling or proper disposal. Although this may be done by automated means, one can simply have an operator open the closed pockets of the bags as they are processed and deposit the batteries in a central location. As noted above, the number of batteries generated in each household in a given collection period (e.g. one week where garbage is collected weekly by the waste management facilitator) tends to be relatively small. If the pocket is sized to retain a suitable number of batteries, one primary container may be provided with a pocket while others need not have such pockets. This will make battery handling at the sorting site even more simple because it will reduce the number of pockets which would need to be opened to collect all of the used batteries.

If it is deemed necessary or desirable, the pocket 25 may be provided with a "child-proof" closure; many such closures are known in the art and need not be detailed here. Such a closure can also be employed on the opening in the primary container itself for similar reasons, if so desired.

In one embodiment, the primary container 10 has a volume of approximately 2.5 cubic feet and can hold approximately 25 pounds of material so that it can be easily handled by virtually any person. Yet, the primary containers 10 may be much larger, e.g. on the order of ten cubic feet and capable of carrying up to 100 pounds of material. The primary containers 10 are reusable and preferably have a may be made of a suitably durable material to have a useful lifetime of approximately twenty years.

Figure 5:
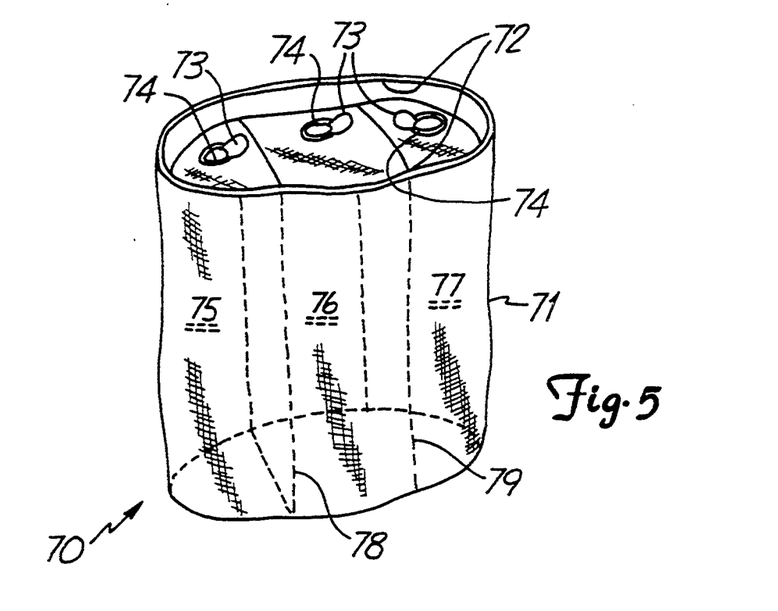
FIG. 5 is a perspective view of another primary container of the invention.

FIG. 5 depicts another embodiment of a primary container 70 in accordance with the invention. The primary container 70 has a first compartment 75, a second compartment 76, and a third compartment 77. The first compartment 75 and second compartment 76 are separated by a wall 78, and the second compartment 76 and the third compartment 77 are separated by a wall 79. Each compartment has a flexible cover 74 in which a cinch line 73 is disposed. The primary container 70 also has a main seal 72.

Each compartment of the primary container 70 may contain a single type of waste. In preparation for collection, each cinch line 73 is pulled taut to close its corresponding compartment. The main seal 72 is then closed to prevent any of the waste from leaking out of the primary container 70. In order to sort each single type of waste contained in the primary container 70, the process is simply reversed. First, the main seal 72 is opened to provide access to the compartments. The cinch lines 73 are then loosened so that the opening in the flexible cover 74 expands to allow easy extraction of the waste materials contained within each compartment.

Figure 6:
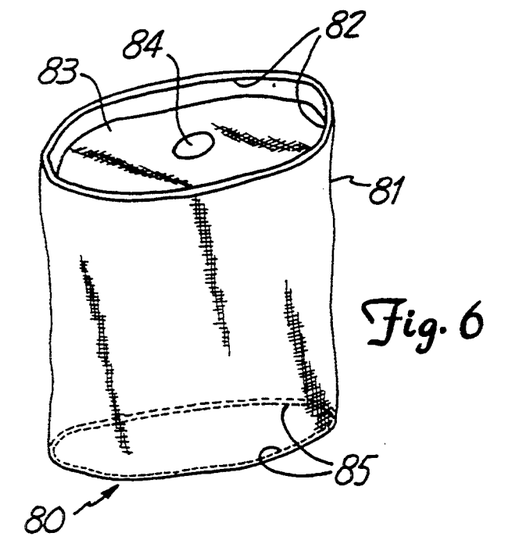
FIG. 6 is a perspective view of yet another primary container of the present invention.

FIG. 6 depicts yet another embodiment of a primary container 80 in accordance with the invention. The primary container 80 has an upper seal 82 and a lower seal 85. An internal ceiling 83 is positioned slightly below the upper seal 82, and contains a hole 84 therethrough. The hole 84 may have a predetermined size and shape to accept only certain types of waste. In using the primary container 80, the upper seal 82 is initially opened while the lower seal 85 is initially closed in order to receive a single type of waste material. After the primary container 80 is full, the upper seal is then closed in preparation for collection. The waste materials are extracted from the primary container 80 by opening the lower seal 85 and simply dumping the waste material out.

The second module of the invention is the secondary containers 30. The secondary containers 30 are similar in design and concept to the primary containers 10, but the secondary containers 30 are much larger and capable of containing significantly more volume and lifting significantly more weight. Generally, the secondary containers 30 have a volume ranging from 10 to 765 cubic feet.

Figure 7A:
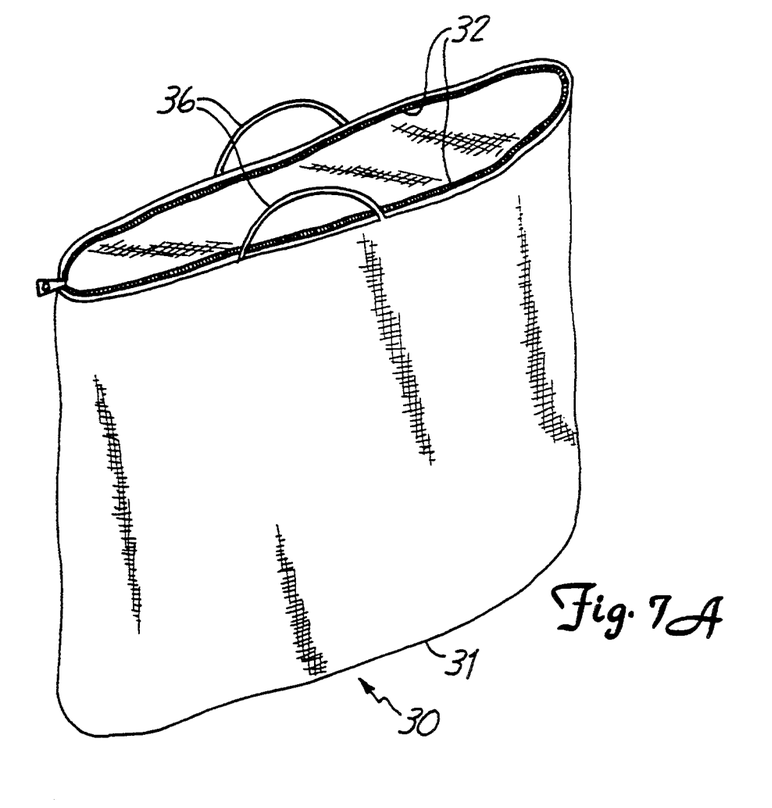
FIGS. 7A, 7B and 7C are perspective views of secondary containers in accordance with the invention.
Figures 7B, 7C:
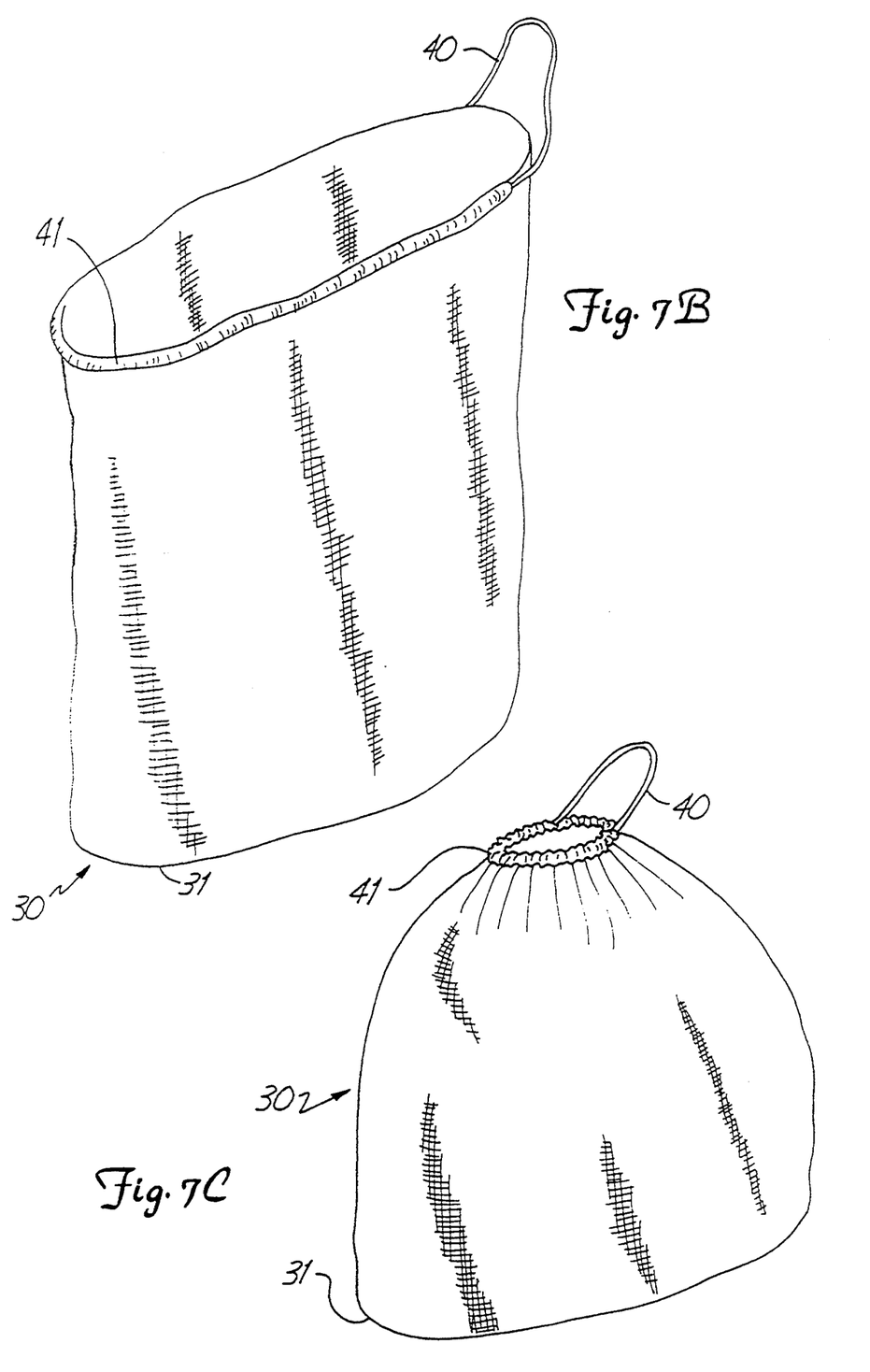

Referring to FIGS. 7A and 7B, the secondary containers have a pouch 31 which may be made from a single component or a combination of components such as nylon, synthetic rubber, rubber, kevlar, nitrylvinyl or the like. In a preferred embodiment, the pouch is made from two plies of material, each about one-quarter inch thick. The secondary containers 30 have a water-tight seal 32 which seals the pouch 31. In one embodiment, the seal 32 is a water-tight zipper. The secondary container, however, may not necessarily be sealed. In an embodiment in which the secondary container is not sealed, the secondary container may include a cinch line 40 which is carried in a track 41. The cinch line 40 works in a manner which is analogous to a stuff sack for sleeping bags as shown in FIG. 7C. The secondary containers 30 may include at least one lifting means 36 for interfacing with a hoist (not shown) on a collection vehicle. In a preferred embodiment, the lifting means 36 are "D" rings.

The secondary containers 30 are used in the second level of the system, and are generally placed outside of an individual's home or business. Each secondary container 30 may be positioned in a dumpster (not shown) or a rigid frame (not shown), or left free standing. In the situation of positioning the container 30 within a dumpster, the secondary container 30 acts as a liner within the dumpster. In the second level of the system, several primary containers 10, each filled only with a single type of waste, are aggregated within a secondary container 30. The secondary container 30 may then sealed or cinched in preparation for collection.

Figure 8:
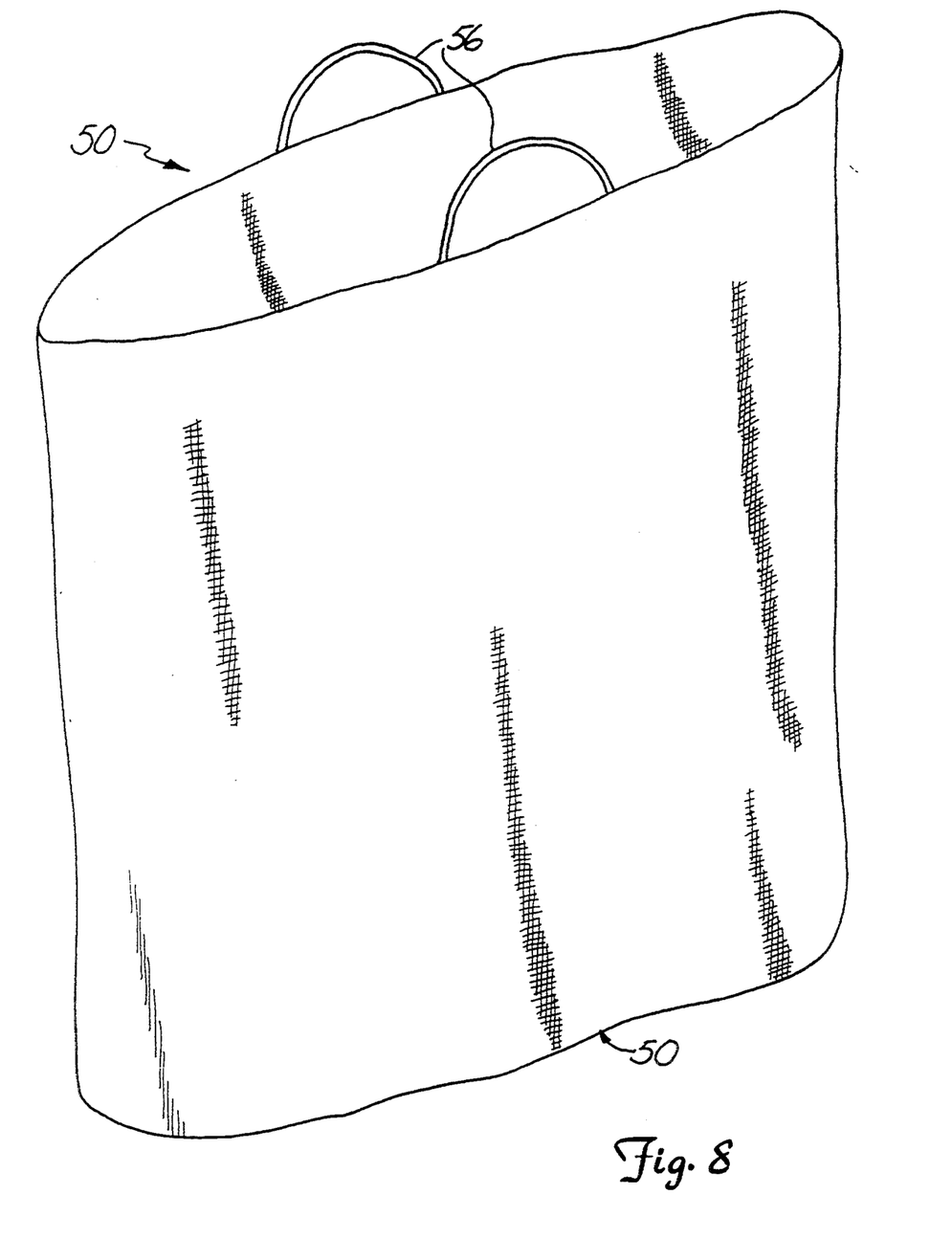
FIG. 8 is a perspective view of a tertiary container in accordance with the invention.

The third module of the invention is the tertiary container 50. Referring to FIG. 8, the tertiary container 50 includes a bag 51 which may be made from a single component or a combination of components such as synthetic or natural rubber materials, kevlar, nitrylvinyl or the like. The tertiary container 50 is substantially larger than the secondary containers 30, and may have a volume of about 700–1,200 cubic feet. In a preferred embodiment, the tertiary containers 50 include lifting means 52 which may be "D" rings.

The tertiary containers 50 are used in the third level of the invention. Referring to FIG. 1, each tertiary container 50 is inserted into a rigid frame 92 carried by a collection vehicle 90. The rigid frame 92 may be a simple skeletal structure as shown or four solid walls. The sealed secondary containers 30 from each individual user's location are placed within the tertiary container 50 positioned within a collection vehicle, and hauled to a centralized collection site. Once at the centralized collection site, the entire tertiary container 50 is extracted from the collection vehicle, and each individual secondary container is opened to remove the primary containers 10. The primary containers 10 are then sorted according to the type of waste in each container as determined by the identification tags 16 and/or window 22. After sorting, the primary containers 10 are emptied at an appropriate recycling or composting location.

Figure 2:
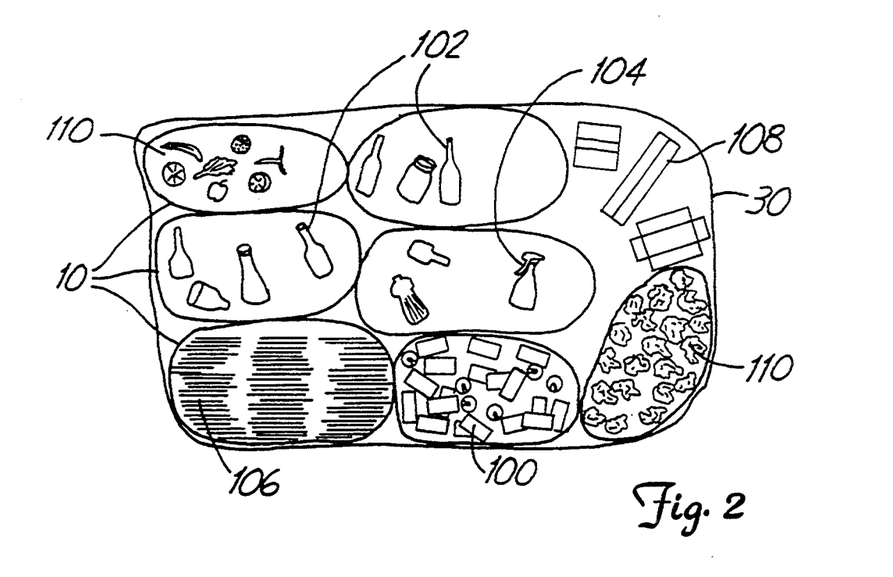
FIG. 2 is a cross-section view of a secondary container holding several primary containers in accordance with the invention.

The relationship of the primary and secondary containers of the present invention is best understood by referring to FIG. 2, which is a cross-sectional view of a secondary container 30 holding several primary containers 10 that are each filled with a single type of waste material. A first primary container 10 contains aluminum waste 100, a second and third primary container 10 contains glass waste 102, a fourth primary container 10 contains plastic waste 104, a fifth primary container 10 contains paper waste 106, and sixth and seventh primary containers 10 contain compostable food wastes 110. As depicted in FIG. 2, each primary container contains only a single type of waste material, but the secondary container 30 may contain several different types of waste materials.

A unique application of the apparatus of the present invention involves the collection of cardboard. Generally, cardboard is very difficult to collect because conventional containers cannot efficiently handle its various sizes and bulky nature. Collecting cardboard in the present invention, however, is not a problem as shown in FIG. 2. In the present invention, a number of cardboard boxes 108 may merely be placed in a vacant portion of a secondary container 30 without having to be individually separated from the rest of the waste. The cardboard boxes 108 do not need to be separated in the present invention because the primary containers 10 contain the other waste materials in a manner in which they cannot leak, which obviates the need to separate the cardboard.

Although the waste streams remain segregated at the level of the primary containers 10, it is not necessary to maintain such segregation at the level of the secondary containers 30. As such, the primary containers 10 may be aggregated and collected within the secondary containers 30 without regard to the type of waste contained within the primary containers.

The assembly 60 of the present invention provides an apparatus that reduces the cost of collecting and separating waste, and adequately solves the problems of odors and putrefied leakage involved in disposing of compostable wastes. The assembly 60 reduces the capital expenditures involved in separating and collecting waste materials as it does not require expensive and highly specialized collection vehicles. Unlike conventional systems which use trucks having compactors or separator systems, the assembly 60 only requires a truck or trailer having a minimal enclosure and hoist. The assembly 60 also reduces labor costs because the primary containers 10 may be aggregated within the secondary containers 30 without regard to the type of waste in the primary containers. Again, unlike conventional systems in which the segregation of waste materials must be maintained by the sanitation personnel as they collect the waste from each individual user, the assembly 60 allows the sanitation personnel to quickly collect the waste materials without depositing certain types of waste materials in corresponding bins. Instead, the waste materials in the present invention can be sorted at a centralized collection site by sorting the primary containers 10 according to the type of waste in each primary container. As a result, the efficiency is improved because the individual steps of the separating and collecting process are all performed at the same time, eliminating many of the repetitive intermediate steps.

Equally important to the economical advantages, the present invention also provides an apparatus for the safe and convenient disposal of compostable waste materials. Conventional systems cannot adequately dispose of compostable waste materials because their devices do not contain odors or leakage of putrefied liquids. Unlike conventional systems, however, the primary and secondary containers of the assembly 60 may be sealed, preventing the odors or putrefied liquids of decomposing materials to escape into the environment. As a result, decomposing materials may be stored for a significant period of time without causing health hazards or being a public nuisance.

Additionally, the primary containers 10 and secondary containers 30 are convenient and easy for consumers to use. The primary containers 10 are durable and substantially puncture-proof so that they are ideal for containing everything from everyday garbage to yard waste. The primary containers 10 also are reusable, and thus do not further add to the waste stream.

The method of using the assembly 60 of the present invention involves providing a plurality of primary containers 10 and at least one secondary container 30 to each individual user. Each single type of waste material is then discarded into a separate primary container 10, and each primary container 10 is sealed after it is full. The filled primary containers 10 are then aggregated into a single secondary container 30 so that the waste remains separated within each primary container 10 but not within the secondary containers 30. The filled secondary containers 30 are then collected and inserted into a tertiary container 50 held on a collection vehicle.

The assembly 60 of the primary containers 10, secondary containers 30 and tertiary container 50 may then be hauled to a collection site where the tertiary container is extracted from the collection vehicle, the secondary containers are unloaded from the tertiary containers, and the primary containers 10 are removed from the secondary containers. This can be done immediately after the tertiary containers are unloaded at the collection site, but it is to be understood that a number of the tertiary containers can be held at a staging area for processing so that collection of the waste from users will not be delayed by delays in processing of the tertiary containers.

Alternatively, the filled tertiary containers can be collected at a designated holding site for transport with a number of other tertiary containers to the collection and processing site. For example, in an area positioned along a waterfront, a series of holding sites can be designated along the waterfront. As trucks or the like fill the tertiary containers carried thereon, they can proceed to one of the holding sites rather than driving all the way to the centralized collection site. A barge or the like can then proceed along the waterfront and collect the tertiary containers (e.g. by lifting them aboard with a crane or the like) at these holding sites and transport them to the central collection site. Much the same process could also be employed using trains by spacing a series of holding sites along a major rail line and having a the tertiary containers loaded onto the train for transport to the collection site.

The primary containers 10 are then sorted according to the type of waste that they contain by noting the identification tags 16 and/or window 22. After the primary containers 10 have been sorted, they may be emptied at an appropriate site for processing the type of waste that they contain. The primary and secondary containers are then cleaned, sterilized and redelivered to each individual user for muse.

Figure 9:
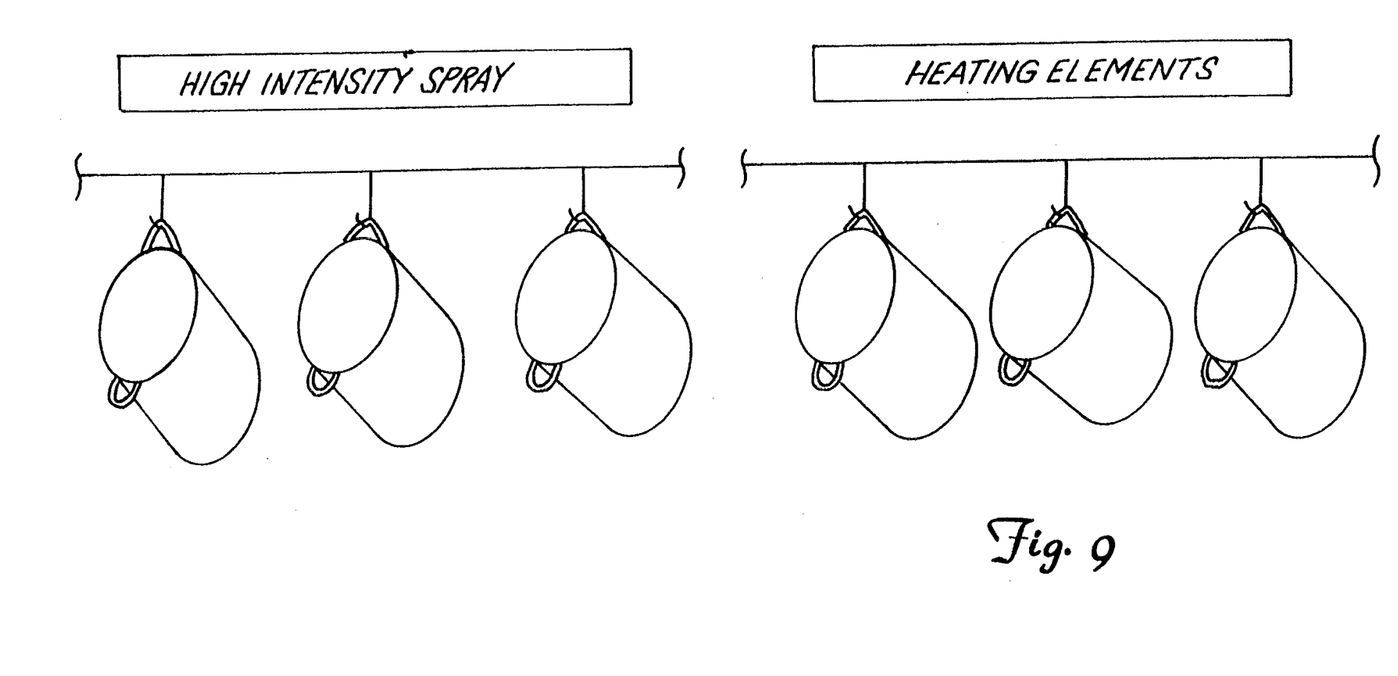
FIG. 9 is a schematic view of a cleaning step including an automatic wash with a heating element and conveyor line in accordance with the invention.

The primary and secondary containers may be cleaned and sterilized in an automatic washing system schematically shown in FIG. 9. The automatic washing system of the present invention is analogous to a large scale system having a high intensity spray, a heating element and a moveable conveyor line. The primary and secondary containers may be suspended from the moveable conveyor line and moved through a high intensity spray. In one embodiment, the high intensity spray may be manipulated by robotics to adjust the sprayers to the different shapes of the containers. After the containers are cleaned, the conveyor line may carry the containers into an area controlled by the heating dement to be sterilized. In a preferred embodiment, the containers are heated to a temperature of approximately 150° F. for approximately fifteen minutes. It will be appreciated that other methods of sterilization such as ultraviolet radiation may also be used.

The process of the invention requires two sets of primary and secondary containers. Referring to FIG. 1, the first set includes primary containers 10 and secondary containers 30, and a second set includes primary containers 10' and secondary containers 30'. The waste from individual users is initially deposited in the first set of containers, and then the first set of containers is collected by a collection vehicle 90. The second set of containers is a fresh set which is delivered to each individual user for use during the next waste period. In FIG. 1, the primary containers 10' and secondary containers 30' are shown in their collapsed state so that they may be stacked and conveniently transported by the collection vehicle 90. It will be appreciated that the two sets are rotated so that the individual users always receive a fresh set of containers when their waste is collected.

While a preferred embodiment of the present invention has been described, it should be understood that various changes, adaptations and modifications may be made therein without departing from the spirit of the invention and the scope of the appended claims.

What is claimed is:

1. A waste collection and separation apparatus comprising:
    a plurality of primary reusable containers for receiving separated waste materials at a location of an individual user, each primary container being filled with a single type of waste material, the primary containers having a volume of not more than about 10 cubic feet, and being sealable, flexible and substantially puncture resistant;
    a plurality of secondary reusable containers for aggregating a plurality of filled primary containers at the location of the user in preparation of collection, the secondary containers having an opening, means for lifting and a volume of about 10 to about 765 cubic feet, and being flexible and substantially puncture resistant; and
    tertiary reusable containers having means for lifting and a volume of at least about 700 cubic feet, and being flexible and substantially puncture resistant;
    wherein a plurality of primary containers filled with the waste materials are contained within a secondary container, and a plurality of secondary containers containing the filled primary containers are contained within a tertiary container.

2. The apparatus of claim 1 wherein the primary, secondary and tertiary containers are made from a material selected from the group consisting of rubber, polyamides, nylon and nitrylvinyl materials.

3. The apparatus of claim 1 wherein the primary containers are sealed by a substantially leak-proof zipper.

4. The apparatus of claim 1 wherein the primary containers are sealed by a cap.

5. The apparatus of claim 4 further comprising a tether attaching the cap to the primary container.

6. The apparatus of claim 1 wherein the secondary containers have a selectively openable seal movable from an open position providing access to the interior of the container and a closed position wherein the container is provided with a substantially leak-proof seal.

7. The apparatus of claim 6 wherein the seal comprises a zipper.

8. The apparatus of claim 1 wherein the means for lifting the secondary containers is a cinch line positioned around the opening, the cinch line being movable with respect to the perimeter of the opening so that the size of the opening is substantially reduced as the cinch line is pulled.

9. The apparatus of claim 1 wherein the primary and secondary containers have venting valves for releasing gas from the container when the pressure therein exceeds a predetermined level.

10. The apparatus of claim 1 wherein the primary container has a manually graspable handle.

11. The apparatus of claim 1 wherein the means for lifting the secondary and tertiary containers comprises a D-ring.

12. The apparatus of claim 1 wherein the primary containers each include an identification tag, each identification tag indicating the type of waste material contained therein.

13. The apparatus of claim 1 wherein the primary containers each include a window permitting users to view the waste within the container.

14. The apparatus of claim 1 wherein the primary containers include a pocket for holding waste batteries.

15. A waste collection and separation method comprising the steps of:
   a) providing a plurality of primary reusable containers to individual users for use in waste receptacles, the primary containers being sealable and made from a flexible, substantially puncture proof material;
   b) separating recyclable and compostable waste materials into separate waste streams having common recycling characteristics;
   c) discarding each separated waste stream into a separate primary container;
   d) sealing each primary container;
   e) providing a secondary reusable container to each individual user for use in waste receptacles, the secondary container being capable of containing a plurality of primary containers, having a handle and being substantially sealable and being made from a flexible, substantially puncture proof material;
   f) aggregating the primary containers into the secondary container at each individual user's location;
   g) providing a tertiary reusable container in a collection vehicle, the tertiary container having a lifting means and adapted to contain several secondary containers, and being made from a flexible, substantially puncture proof material;
   h) depositing the secondary container at each user's location into a tertiary container on a collection vehicle;
   i) hauling the tertiary container in the collection vehicle to a collection site;
   j) lifting the tertiary containers from the collection vehicle at the collection site;
   k) unloading the secondary containers from the tertiary container at the collection site;
   l) removing the primary containers from the secondary containers at the collection site;
   m) sorting the primary containers at the collection site according to the waste contained therein;
   n) emptying the primary containers at an appropriate site for recycling the waste contained therein;
   o) cleaning the primary and secondary containers; and
   p) redelivering cleaned and sanitized primary and secondary containers to each individual user for reuse.

16. The method of claim 15 wherein the cleaning step comprises providing an automatic wash having a high intensity spray, a heating element and a moveable conveyor line, the primary and secondary containers being suspended from and moved along the conveyor line, the step comprising washing the primary and secondary containers in the automatic wash, and heating the containers so that they are substantially sterilized.

* * * * *